(12) United States Patent
Kim

(10) Patent No.: US 7,894,397 B2
(45) Date of Patent: Feb. 22, 2011

(54) INTERRUPTING USE OF FREQUENCY LAYER CONVERGENCE SCHEME

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/556,280

(22) Filed: Sep. 9, 2009

(65) Prior Publication Data

US 2009/0323624 A1    Dec. 31, 2009

Related U.S. Application Data

(63) Continuation of application No. 12/247,181, filed on Oct. 7, 2008, now Pat. No. 7,602,802, which is a continuation of application No. 11/198,442, filed on Aug. 5, 2005, now Pat. No. 7,512,145.

(60) Provisional application No. 60/599,590, filed on Aug. 5, 2004, provisional application No. 60/600,244, filed on Aug. 9, 2004, provisional application No. 60/601,267, filed on Aug. 12, 2004.

(51) Int. Cl.
  H04W 4/00     (2009.01)
(52) U.S. Cl. ................. 370/329; 370/432; 370/343; 455/3.04; 455/464
(58) Field of Classification Search ............ 370/432, 370/329, 343, 331, 335, 312, 231, 458, 388; 455/3.04, 67.13, 552.1, 412.2, 450, 461, 455/445, 517, 509, 516, 550.1, 525, 524, 455/449, 418, 452.1, 464, 566
See application file for complete search history.

(56) References Cited

U.S. PATENT DOCUMENTS 6,163,694 A    12/2000 Lind et al.
6,463,054 B1    10/2002 Mazur et al.
7,200,670 B1     4/2007 Hearn et al.
7,602,802 B2 *  10/2009 Kim .......................... 370/432

(Continued)

FOREIGN PATENT DOCUMENTS

RU         99108440       2/2001

(Continued)

OTHER PUBLICATIONS

Schulzrinne, H., et al., "RTP: A Transport Protocol for Real-Time Applications", Internet Engineering Task Force (IETF) Network Working Group Request for Comments: 3550, retrieved online=http://www.ietf.org/rfc/rfc3550.txt?number=3550, Jul. 2003.

(Continued)

Primary Examiner—Tan Trinh
(74) Attorney, Agent, or Firm—Lee, Hong, Degerman, Kang & Waimey

(57) ABSTRACT

The present invention is directed to interrupting use of a frequency layer convergence scheme that favors selection of a cell on a preferred frequency of a joined point-to-multipoint service. Specifically, a mobile terminal that has joined a point-to-multipoint service having a preferred frequency uses a frequency layer convergence scheme for selecting a cell. The frequency layer convergence scheme favors the selection of a cell on the preferred frequency layer. However, use of the frequency layer convergence scheme is interrupted upon an occurrence of a trigger.

19 Claims, 11 Drawing Sheets

U.S. PATENT DOCUMENTS

| | | | |
|---|---|---|---|
| 2001/0036827 A1 | 11/2001 | Edlund et al. | |
| 2003/0156578 A1 | 8/2003 | Bergenlid et al. | |
| 2006/0212501 A1* | 9/2006 | Gerrits et al. | 708/300 |
| 2007/0112573 A1* | 5/2007 | Gerrits et al. | 704/501 |
| 2008/0070584 A1* | 3/2008 | Kuo | 455/452.1 |
| 2008/0112352 A1* | 5/2008 | Kuo | 370/312 |
| 2008/0112367 A1* | 5/2008 | Kuo | 370/335 |
| 2008/0113662 A1* | 5/2008 | Kuo | 455/418 |

FOREIGN PATENT DOCUMENTS

| | | |
|---|---|---|
| RU | 2180159 | 2/2002 |
| WO | 01/74103 | 10/2001 |

OTHER PUBLICATIONS

Federal Service for Intellectual Property, Patents and Trademarks (ROSPATENT), "Decision on Granting a Patent for Invention for App. No. 2006140729/09," Jul. 22, 2009.

* cited by examiner

US 7,894,397 B2

INTERRUPTING USE OF FREQUENCY LAYER CONVERGENCE SCHEME

CROSS-REFERENCE TO RELATED APPLICATIONS

This is a continuation of application Ser. No. 12/247,181, filed on Oct. 7, 2008, now U.S. Pat. No. 7,602,802, which is a continuation of Ser. No. 11/198,442, filed on Aug. 5, 2005, now U.S. Pat. No. 7,512,145, which pursuant to 35 U.S.C. §119(e), claims the benefit of earlier filing date and right of priority to U.S. Provisional Application No. 60/599,590, filed on Aug. 5, 2004, U.S. Provisional Application No. 60/600,244, filed on Aug. 9, 2004, and U.S. Provisional Application No. 60/601,267, filed on Aug. 12, 2004, the contents of all of which are hereby incorporated by reference herein in their entirety.

FIELD OF THE INVENTION

The present invention relates to cell selection in a wireless communication system, and more particularly, to interrupting use of a frequency layer convergence scheme which favors the selection of a cell on a preferred frequency of a joined point-to-multipoint service.

BACKGROUND OF THE INVENTION

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

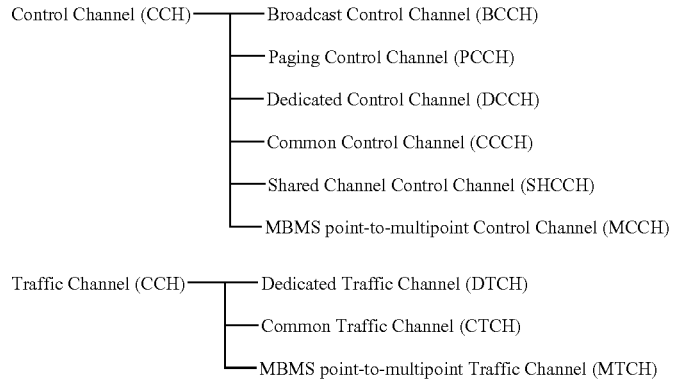

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from 0 to SF-1. Each code can thus be identified by giving its length (i.e. spreading factor) and the number of the code. The spreading code that is used by the P-CCPCH is always of a fixed spreading factor 256 and the number is the number 1. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel dedicated for MBMS service. When the UE has selected a cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

According to the 3GPP standard, a UE in CELL_PCH, URA_PCH or CELL_FACH state, or in idle mode shall constantly try to select/reselect a suitable cell (for non-emergency calls) or acceptable cell (for emergency calls). In idle mode, when the UE has selected a cell, the UE is commonly referred to as "camping" on the cell. In RRC connected mode, when the UE is in CELL_PCH, URA_PCH, or CELL_FACH state, the UE is simply referred to as having "selected" a cell.

To facilitate the cell reselection, the network transmits in the system information lists of neighboring cells. The lists of neighboring cells identify available cells the UE should measure and compare to the cell the UE has currently selected or the cell the UE camps on. The available cells may be on the same frequency, on other frequencies or on other Radio Access Technologies (RATs) such as GSM. The list of cells, and evtl. cells that the UE discovers itself are used as candidates for the cell reselection.

One part of the cell selection/reselection process is based on measurements of the quality of the different cells that are part of the neighboring cell list that are candidates for cell reselection. A cell may or may not be part of a hierarchical cell structure (HCS). This is defined in the system information of the given cell. In case of the hierarchical cell structure, each cell has a given priority. Depending on whether the cell is part of the hierarchical cell structure or not, the cell selection procedure changes.

To decide which of the candidate cells to reselect, the UE measures the quality of the neighboring cells. The UE uses a given formula to establish a ranking criteria R of all candidate cells. The formula is based on measurements on the CPICH/P-CCPCH and on information received in the system information of the candidate cell. The criterion R corresponds to a positive or negative value. The R value may be calculated by the following, wherein $R_S$ is the R value for the serving cell $R_N$ is the R value for neighboring cells:

$$R_s = Q_{meas,s} + Qhyst_s + Qoffmbms$$
$$R_n = Q_{meas,n} - Qoffset_{s,n} + Qoffmbms - TO_n * (1 - L_n)$$
$$TO_n = \text{TEMP\_OFFSET}_n * W(\text{PENALTY\_TIME}_n - T_n)$$
$$L_n = 0 \quad \text{if HCS\_PRIO}_n = \text{HCS\_PRIO}_s$$
$$L_n = 1 \quad \text{if HCS\_PRIO}_n <> \text{HCS\_PRIO}_s$$
$$W(x) = 0 \quad \text{for } x < 0$$
$$W(x) = 1 \quad \text{for } x >= 0$$

The signaled value Qoffmbms is only applied to those cells (serving or neighboring) belonging to an MBMS Preferred Frequency (i.e., where a frequency convergence scheme is applied). Qmeas gives the quality value of the received signal derived from the averaged CPICH Ec/No or CPICH RSCP for FDD cells, from the averaged P-CCPCH RSCP for TDD cells and from the averaged received signal level for GSM cells. For FDD cells, the measurement that is used to derive the quality value is indicated in System Information.

The parameters Qhyst, Qoffsets,n, Qoffmbms, TEMP_OFFSET and PENALTY_TIME are signaled on System information. The timer T is started and stopped for each cell depending on the radio quality of the cell.

If a hierarchical cell structure (HCS) is used, then a criteria H is defined. The H criterion is a positive or negative value and is calculated based on information sent in the system information and on measurements from the CPICH/P-CPCCH of the candidate cell. In the hierarchical cell structure, a cell may have a different priority. The H criterion is calculated according to the following formula:

$$H_s = Q_{meas,s} - Qhcs_s$$
$$H_n = Q_{meas,n} - Qhcs_n - TO_n * L_n$$

$TO_n$ and LN, $Q_{meas,s}$ and $Q_{meas,n}$ are defined similarly to the above definition. The aim of such a cell structure is to cover in the same area users that have a low mobility as well as users with a high mobility. To optimize capacity, small-sized cells are preferred to accommodate as many cells as possible. Accordingly, this enables having a maximum number of users in a given area.

However, for users that move quickly, it is preferable to have large-sized cells to reduce the number of cell changes as the UE moves. To distinguish between large-sized and small-sized cells, different priorities are attributed to the cell. The UE tends to select cells with the highest priority. This generally corresponds to small-sized cells, except when the UE is moving quickly. The H criterion is used in the 3GPP standard to take into account the priority. However, when the UE detects that it is moving quickly (i.e. by detecting that the UE reselects cells often), the UE ceases using the H criteria and no longer takes into account the priority level of the cell. The UE is then said to be in a "high mobility state".

A selection criterion S checks whether the received quality of the candidate cell is sufficient. To do so the, UE measures $Q_{qualmeas}$, which expresses the $E_c/N_0$ of the CPICH of the candidate cell (only for FDD cells). The UE also measures $Q_{rxlevmeas}$, which evaluates the RSCP (Received Signal Code Power) of the CPICH of the candidate cell for FDD cells and the P-CCPCH of the candidate cell for TDD cells. The UE uses these values in an algorithm, together with information received in the system information of the candidate cell, to calculate the S value. If the S value is higher than 0, the selection criterion S of the cell is fulfilled. Otherwise, it is not fulfilled.

Apart from the criteria R, H and S explained above, other criteria might determine which cell the UE can select. The information on these criteria is given to the UE as "cell access restrictions", which are broadcast in the system information.

One type of cell access restriction may be "barred cells." Each UE uses a parameter called "Access Class", which gives a kind of priority to the UE. The access classes that exist are in the range of 0 to 15. For each of the access classes in the system information, it can be indicated whether a cell is barred or not. A cell can also be barred in general.

Another type of cell access restriction is when a cell is "reserved for operator use". In the system information, it can be indicated whether a cell is reserved for operator use or not. Depending on whether the UE class is an operator class or not, and whether the UE is in an emergency call or not, the UE can reselect a cell which is reserved for operator use or not.

Moreover, access to the cell may be restricted because it is "reserved for future extension". In the system information, it can be indicated whether a cell is reserved for future extension or not.

Access to the cell may be restricted due to a PLMN. Each cell belongs to one or several PLMNs. When a UE is powered on, it selects a PLMN and can only change the selected PLMN by specific signaling. When the UE selects/reselects a cell, it checks whether the selected PLMN corresponds to the PLMN of the cell. A UE can use a list of "equivalent PLMNs", wherein an "equivalent PLMN" is treated as if it was equal to the selected PLMN. A UE that is not trying to do an emergency call can only select/reselect cells that belong to the selected PLMN or an equivalent PLMN of the selected PLMN.

An "intra-frequency cell re-selection indicator" is also sent in the system information to disallow the UE when the cell the UE has selected is barred from reselecting another cell on the same frequency.

Accordingly, the above "cell access restriction" attributes limit the number of candidate cells the UE can consider for cell selection/reselection. Referring to FIG. 6, a decision process for cell reselection is illustrated.

A major task of the RNC is radio resource management (RRM). Different RRC states, transport channels and physical channels with multiple parameters are available in the UMTS standard to optimize use of available radio resources.

A basic method for RRM purposes is the RRC state transition between CELL_FACH, CELL_DCH, CELL_PCH and URA_PCH states. Combined with these states, when different frequencies are available for communication, the RNC can generally control the number of UEs using a given frequency. However, as described above, in CELL_FACH state, CELL_PCH state and URA_PCH state, the UEs can initiate, based on the measurements and the different rules, the transition from a cell in a given frequency to a cell in another frequency. The transition is either based on normal measurement and cell selection/reselection rules or based on a frequency layer convergence scheme.

When the UE is moved from the CELL_DCH state to another state, the UE selects a cell to camp on or connect to. In general, the UE considers cells on all frequencies, except if the RNC indicates a preferred frequency in an information element (IE) "Frequency Info". In such a case, the UE preferably selects a cell on the preferred frequency if a suitable cell on the preferred frequency exists.

When the UE is in CELL_FACH state, the RNC may prompt the UE to select a cell on another frequency as the preferred frequency by sending a message including the IE "Frequency Info" to the UE. The UE will then try to select a cell on the preferred frequency.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward-dedicated service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 7 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Contrary to the multicast service, for broadcast services, as shown in FIG. 8, only the announcement of the service must be done in a transparent manner. No subscription or joining is needed. Afterwards, the actions that are transparent to the RNC are the same as for multicast services.

Referring to FIG. 9, a typical session sequence from a UTRAN perspective is illustrated. As shown, the SGSN informs the RNC about a session start (step 1). The RNC may then perform a counting procedure, which triggers some UEs to establish a connection to the PS domain (step 2). Consequently, the establishment of an RRC connection for the UEs is initiated. This allows the RNC to estimate the number of UEs in a given cell that are interested in the service. When the UE has established the PS connection, the SGSN initiates the Iu linking procedure, which provides the list of multicast services the UE has joined to the RNC.

For UEs that have an RRC connection established, and which are interested in the given MBMS service but are not connected to the PS domain, the RNC sends a specific message to the UEs triggering them to establish a PS connection (step 3). When the UE has established the PS connection, the SGSN initiates the Iu linking procedure, which provides the list of multicast services the UE has joined to the RNC. For UEs that are not in a CELL_DCH state, a frequency layer convergence scheme allows the RNC to trigger the UEs to change the frequency to which they listen (step 4).

Depending on the Radio Resource Management (RRM) scheme, the RNC establishes point-to-multipoint (PtM) or point-to-point (PtP) radio bearers for delivering the MBMS service (step 5a or 5b). The RNC delivers data received from the SGSN to the UEs that are part of the multicast group. After the transmission of the data, the SGSN informs the RNC about the end of the sessions (step 6). The RNC then releases the PtP or PtM radio bearers used for transmitting the MBMS data (step 7a or 7b).

Generally, for UEs in an RRC connected state, two possibilities exist. The UE will either have a connection established with the PS domain (PMM connected) or the UE will have no connection established with the PS domain (PMM idle mode). When there is no connection established with the PS domain, the UE will normally have a connection with the CS domain. Otherwise, the UE is not in an RRC connected mode.

For MBMS, two additional control channels are introduced. They are the MCCH and the MICH (MBMS Notification Indicator Channel). As explained above, the MCCH is mapped on the FACH. The MICH is a new physical channel and is used to notify users to read the MCCH channel. The MICH is designed to allow the UEs to perform a DRX (Discontinuous Reception) scheme. DRX allows the reduction of battery consumption for UEs while allowing the UEs to still be aware of any service for which a session is starting. The MICH may be used to inform the UE of a change in a frequency convergence scheme, change of a configuration of a point-to-multipoint (PtM) bearer, switch between the PtM bearer and a point-to-point (PtP) bearer, etc., which all require the MCCH to be read.

The MCCH channel periodically transmits information regarding active services, MTCH configuration, frequency convergence, etc. The UE reads the MCCH information to receive the subscribed services based on different triggers. For example, the UE may be triggered after cell selection/reselection, when the UE is notified of a given service on the MICH, or when the UE is notified via the DCCH channel. The configuration of the MCCH channel is broadcast in the system information. The MICH configuration (i.e. spreading code, scrambling code, spreading factor and other information) is either fixed in the standard, or given in the system information.

The UMTS standard allows use of different frequency bands for data transmission. A frequency band in UMTS is in general specified by a UARFCN (UTRA Absolute Radio Frequency Channel Number), which defines the frequency band used. A given PLMN can use different frequencies.

When a network uses different frequencies, the UEs in a given area select one of the frequencies based on the quality measured on the frequency. The UEs may also select the frequency based on other parameters given in the system information as explained above. To balance the load carried by the different frequencies, the UEs are distributed among the different frequencies. If a given MBMS service is then transmitted on a PtM radio bearer to reach UEs in all frequencies, the transmission must be done in all frequencies.

To increase efficiency, it is advantageous to transmit data on one frequency only and have all UEs interested in a given service reselect a cell in that frequency. Accordingly, this functionality is called "frequency convergence". The frequency layer to which the UEs should reselect is called a PFL (Preferred Frequency Layer). As shown in FIG. 9, a typical MBMS session contains a period of "frequency convergence" (step 4).

When the frequency convergence process is used for a given service, information regarding the preferred frequency for each service is transmitted in messages either on the MCCH or the system information. To trigger the reselection to the other frequency, different possibilities exist. One possibility is to force the UE to select a cell on the preferred frequency and to forbid all cells on other frequencies from participating in cell reselection/cell selection.

Another possibility is to change the requirements for cell reselection. This may be done by adding an offset to the R criteria, S criteria or H criteria in one of the formulas needed to determine whether cell selection should be done. The offset may be added for the cells on the preferred frequency or for all cells on the non-preferred frequencies. Other possibilities can be envisaged for having the UE reselect a preferred frequency.

For the hierarchical cell structure, the UE preferably reselects the cell with the highest priority. If a frequency convergence scheme is used, it is implied that the UE must be allowed to select a cell on the preferred frequency, disregarding the priority of the preferred frequency. Accordingly, use of the frequency convergence scheme may imply that the hierarchical cell structure should no longer be used.

A PRACH channel is an uplink channel shared amongst different UEs. When a UE wants to send data in the uplink on a PRACH channel, a special mechanism exists to avoid having different UEs transmit at the same time. This mechanism is called "collision avoidance," and is implemented in the UMTS system based on a slotted Aloha system. The transmission of a message on the PRACH channel is described in FIG. 10.

Before transmitting on the PRACH channel, the UE transmits a preamble to the NodeB. The preamble comprises a code (signature) the UE chooses randomly amongst the available signatures and transmits it on a special physical channel called a RACH sub-channel. The UE repeats this transmission several times until it receives a positive or negative acknowledgement indicator or a given number of retransmissions are exceeded. The NodeB listens to all sub-channels and tries to detect the given signatures transmitted by the UEs wanting to access the channel. When the NodeB has received the signature, it acknowledges the reception on a special physical channel (AICH) by transmitting a code for indicating to the UE whether the UE is granted access to the PRACH channel or not. Accordingly, the simultaneous transmission of several UEs on the PRACH channel is avoided.

When a UE receives a Not Acknowledged message (NACK) or when the UE does not receive any Acknowledged message (ACK) or NACK on the AICH channel, the UE determines whether it is allowed to restart the collision avoidance process. If another collision avoidance process is allowed according to a fixed algorithm, the UE determines the time to wait before the next collision avoidance process is started. When the UE receives the ACK after a collision avoidance process, i.e. when the UE is granted access to the PRACH, the UE transmits a block set on the PRACH channel.

As described above, a frequency convergence scheme optimizes the use of radio resources by concentrating all UEs interested in a given service onto a given frequency. As a result, some UEs may select a cell on a preferred frequency because they are subscribed to a given MBMS service even though the UEs would not select a cell on the preferred frequency if they were not joined to the MBMS service.

A UE selecting a cell on the "preferred frequency" of an MBMS service to receive the MBMS service potentially has a worse quality of service. This is because potentially many UEs will select the cell or cells on the preferred frequency to receive a given MBMS service on the preferred frequency. Consequently, the load of the cell or cells on the frequency is increased. Also, the radio quality of the selected cell on the preferred frequency may be worse than the radio quality of another frequency.

When a UE wants to establish a call or transmit data in the uplink, depending on the state/mode the UE is in, the UE needs to perform different actions according to the current standard, as shown in Table 1.

TABLE 1

|  | New Call | Transmission of Data (C- or U-plane) |
|---|---|---|
| Idle mode | Transmit the "RRC Connection Request" message on RACH | Transmit the "RRC Connection Request" message on RACH channel channel |
| Connected mode/ CELL_PCH | Transmit the "Cell Update" message on RACH channel | Transmit the "Cell Update" message on RACH channel |
| Connected mode/ URA_PCH | Transmit the "Cell Update" message on RACH channel | Transmit the "Cell Update" message on RACH channel |
| Connected mode/ CELL_FACH | Transmit the "Initial Direct Transfer" message on the RACH channel | Transmit the data/transmit the "measurement report" message on RACH channel |
| Connected mode/ CELL_DCH | Transmit the "Initial Direct Transfer" message on the dedicated transport channel | Transmit the data on the dedicated transport channel |

As described above, a UE using a frequency convergence scheme because it is joined to an MBMS service will potentially have problems transmitting data on the PRACH channel because of an overloaded cell or bad radio quality. Therefore, a special mechanism is needed to overcome these problems.

The frequency convergence mechanism may also conflict with information on preferred frequencies sent by the RNC at transition from CELL_DCH to CELL_FACH or when the RNC indicates to a UE in a CELL_FACH state to reselect a cell in a given frequency. Accordingly, the efficiency of the system is potentially reduced because active UEs cannot be kept on a separate frequency.

SUMMARY OF THE INVENTION

The present invention is directed to interrupting use of a frequency layer convergence scheme that favors selection of a cell on a preferred frequency layer of a joined point-to-multipoint service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for selecting a cell by a mobile terminal in a wireless communication system, the method comprising joining a point-to-multipoint service having a preferred frequency, using a frequency layer convergence scheme for selecting the cell, wherein the frequency layer convergence scheme favors the selection of the cell on the preferred frequency, and interrupting the use of the frequency layer convergence scheme upon an occurrence of a trigger. Preferably, the point-to-multipoint service is an MBMS service.

In one aspect of the invention, the trigger for interrupting the use of the frequency layer convergence scheme is based on a procedure initiated with a network that fails while using the frequency layer convergence scheme. Preferably, the procedure with the network comprises establishing a connection with a core network (CN) domain. The CN domain is at least one of a packet switched (PS) domain and a circuit switched (CS) domain.

In another aspect of the invention, the procedure with the network comprises at least one of a PRACH access procedure, a radio resource control (RRC) procedure for transmitting information to the network, a medium access control (MAC) procedure for transmitting data to the network, and a procedure for selecting a cell on a given frequency according to an order received from the network.

In a further aspect of the invention, the trigger for interrupting the use of the frequency layer convergence scheme comprises receiving a message for initiating a reconfiguration procedure. Alternatively, the trigger for interrupting the use of the frequency layer convergence scheme comprises initiating a procedure selecting a cell on a given frequency according to an order received from a network.

Preferably, interrupting the use of the frequency layer convergence scheme continues until a timer expires. The timer is started when the frequency layer convergence scheme is first interrupted, a procedure initiated with a network comprising a PRACH access procedure fails, a procedure initiated with a network comprising a medium access control (MAC) procedure for transmitting data to the network fails, or a procedure initiated with a network comprising a procedure for selecting a cell on a given frequency according to an order received from the network fails.

A value for duration of the timer is received in a system information message from a network. Alternatively, a value for duration of the timer is a fixed value.

Preferably, the method further comprises selecting a cell on a frequency other than the preferred frequency. Moreover, the method further comprises initiating a procedure with a network and continuing to interrupt the use of the frequency layer convergence scheme until the procedure initiated with the network ends. Also, the method further comprises initiating a procedure with a network, and releasing a connection with a core network (CN) domain when the procedure initiated with the network ends.

In another embodiment of the present invention, a mobile terminal for selecting a cell in a wireless communication system comprises means for joining a point-to-multipoint service having a preferred frequency, means for using a frequency layer convergence scheme for selecting the cell, wherein the frequency layer convergence scheme favors the selection of the cell on the preferred frequency, and means for interrupting the use of the frequency layer convergence scheme upon an occurrence of a trigger. Preferably, the point-to-multipoint service is an MBMS service.

In one aspect of the invention, the trigger for interrupting the use of the frequency layer convergence scheme is based on a procedure initiated with a network that fails while using the frequency layer convergence scheme. Preferably, the procedure with the network comprises establishing a connection with a core network (CN) domain. The CN domain is at least one of a packet switched (PS) domain and a circuit switched (CS) domain.

In another aspect of the invention, the procedure with the network comprises at least one of a PRACH access procedure, a radio resource control (RRC) procedure for transmitting information to the network, a medium access control (MAC) procedure for transmitting data to the network, and a procedure for selecting a cell on a given frequency according to an order received from the network.

In a further aspect of the invention, the trigger for interrupting the use of the frequency layer convergence scheme comprises receiving a message initiating a reconfiguration procedure. Alternatively, the trigger for interrupting the use of the frequency layer convergence scheme comprises initiating a procedure for selecting a cell on a given frequency according to an order received from a network.

Preferably, interrupting the use of the frequency layer convergence scheme continues until a timer expires. The timer is started when the frequency layer convergence scheme is first interrupted, a procedure initiated with a network comprising a PRACH access procedure fails, a procedure initiated with a network comprising a medium access control (MAC) procedure for transmitting data to the network fails, or a procedure initiated with a network comprising a procedure for selecting a cell on a given frequency according to an order received from the network fails.

A value for duration of the timer is received in a system information message from a network. Alternatively, a value for duration of the timer is a fixed value.

Preferably, the mobile terminal further comprises means for selecting a cell on a frequency other than the preferred frequency. Moreover, the mobile terminal further comprises means for initiating a procedure with a network and means for continuing to interrupt the use of the frequency layer convergence scheme until the procedure initiated with the network ends. Also, the mobile terminal further comprises means for initiating a procedure with a network and means for releasing a connection with a core network (CN) domain when the procedure initiated with the network ends.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
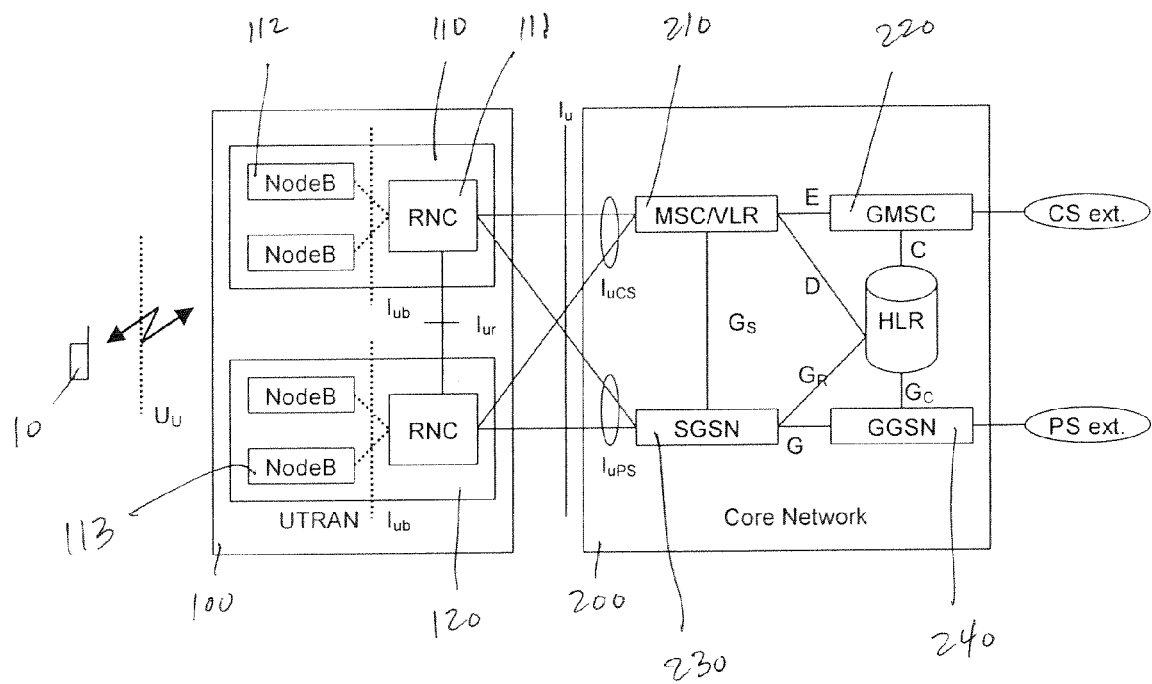
FIG. 1 is a block diagram of a general UMTS network architecture.
Figure 2:
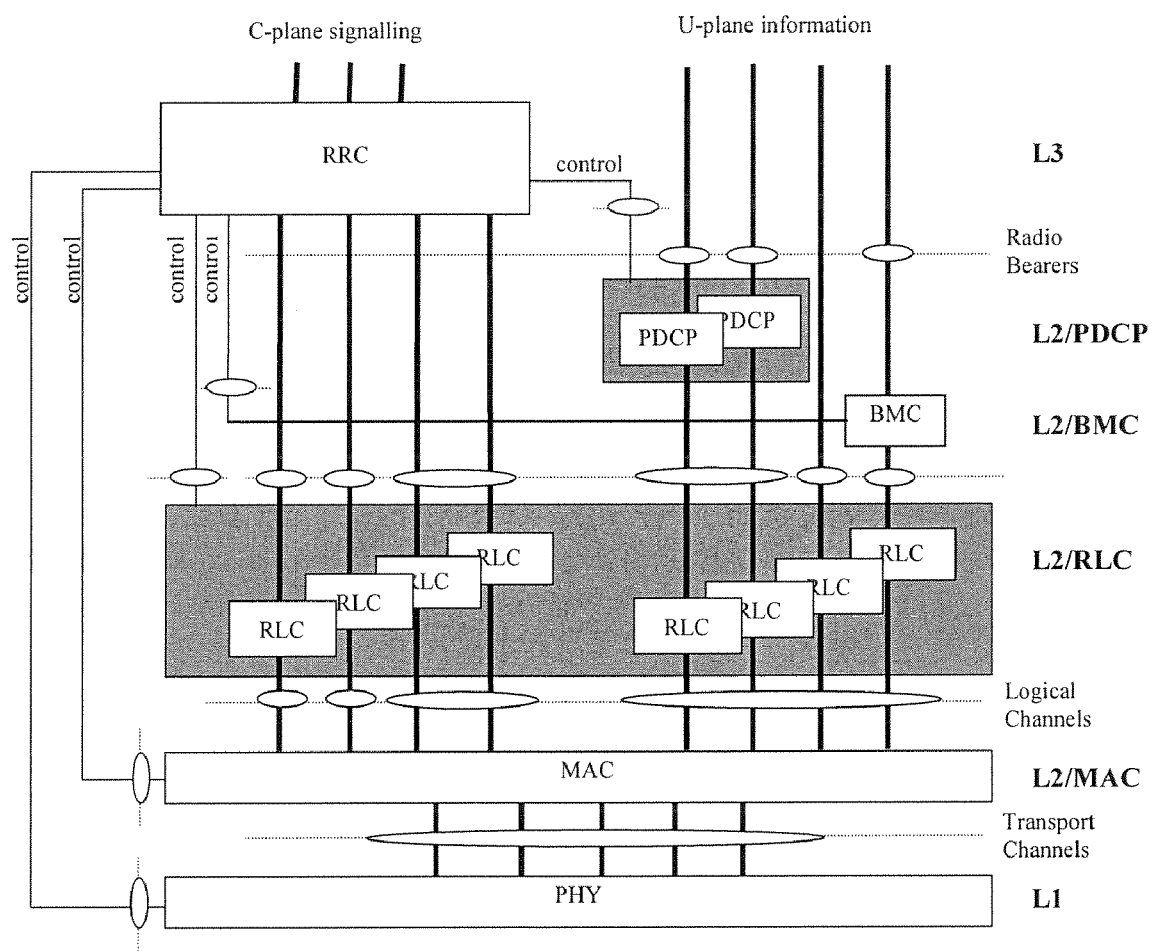
FIG. 2 is a block diagram of a structure of a radio interface protocol between a terminal and a network based on 3GPP radio access network standards.
Figure 3:
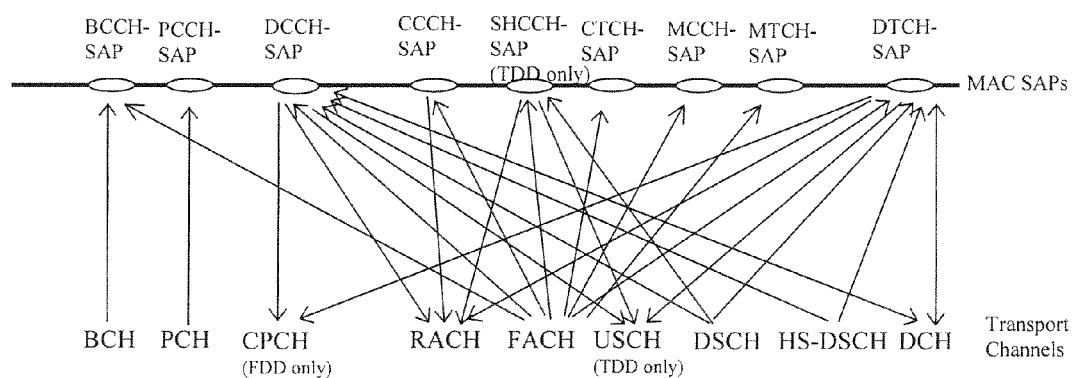
FIG. 3 illustrates the mapping of logical channels onto transport channels in the mobile terminal.
Figure 4:
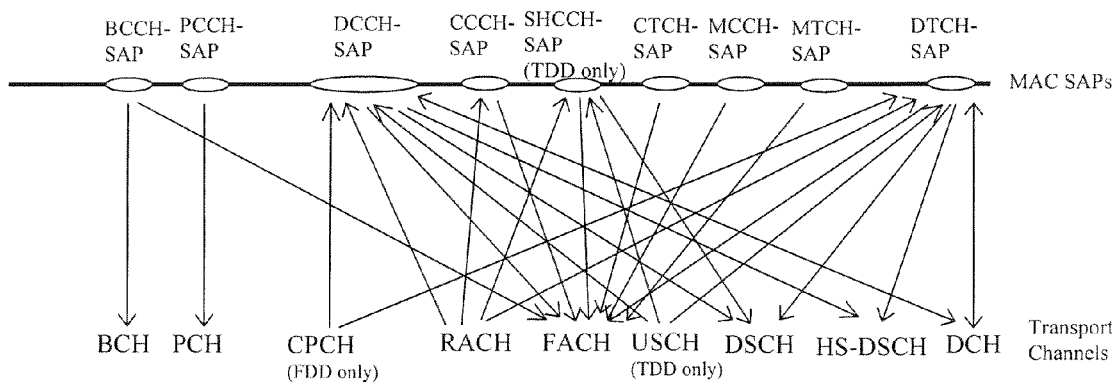
FIG. 4 illustrates the mapping of logical channels onto transport channels in the network.
Figure 5:
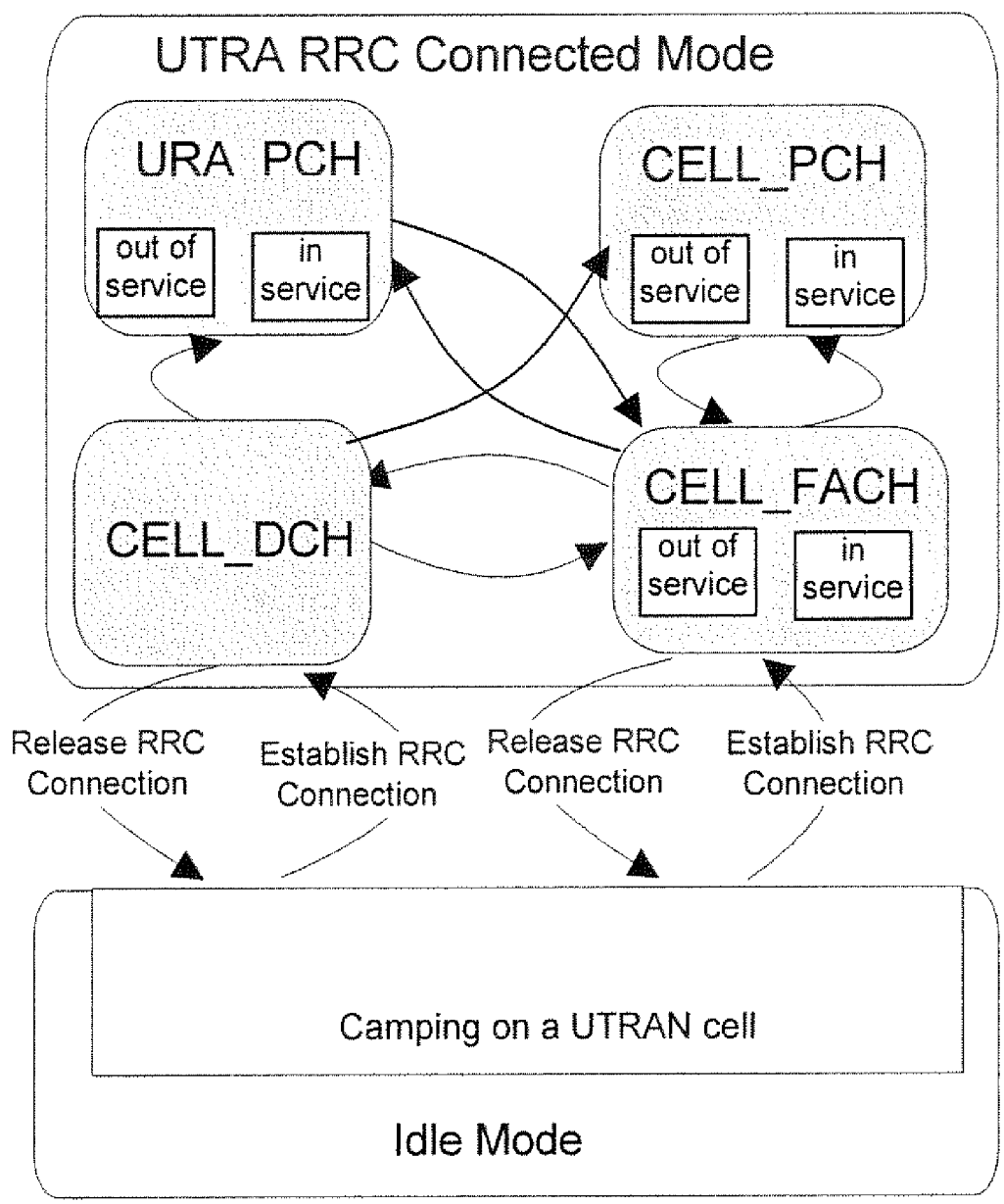
FIG. 5 illustrates possible transitions between modes and states in the UMTS network.
Figure 6:
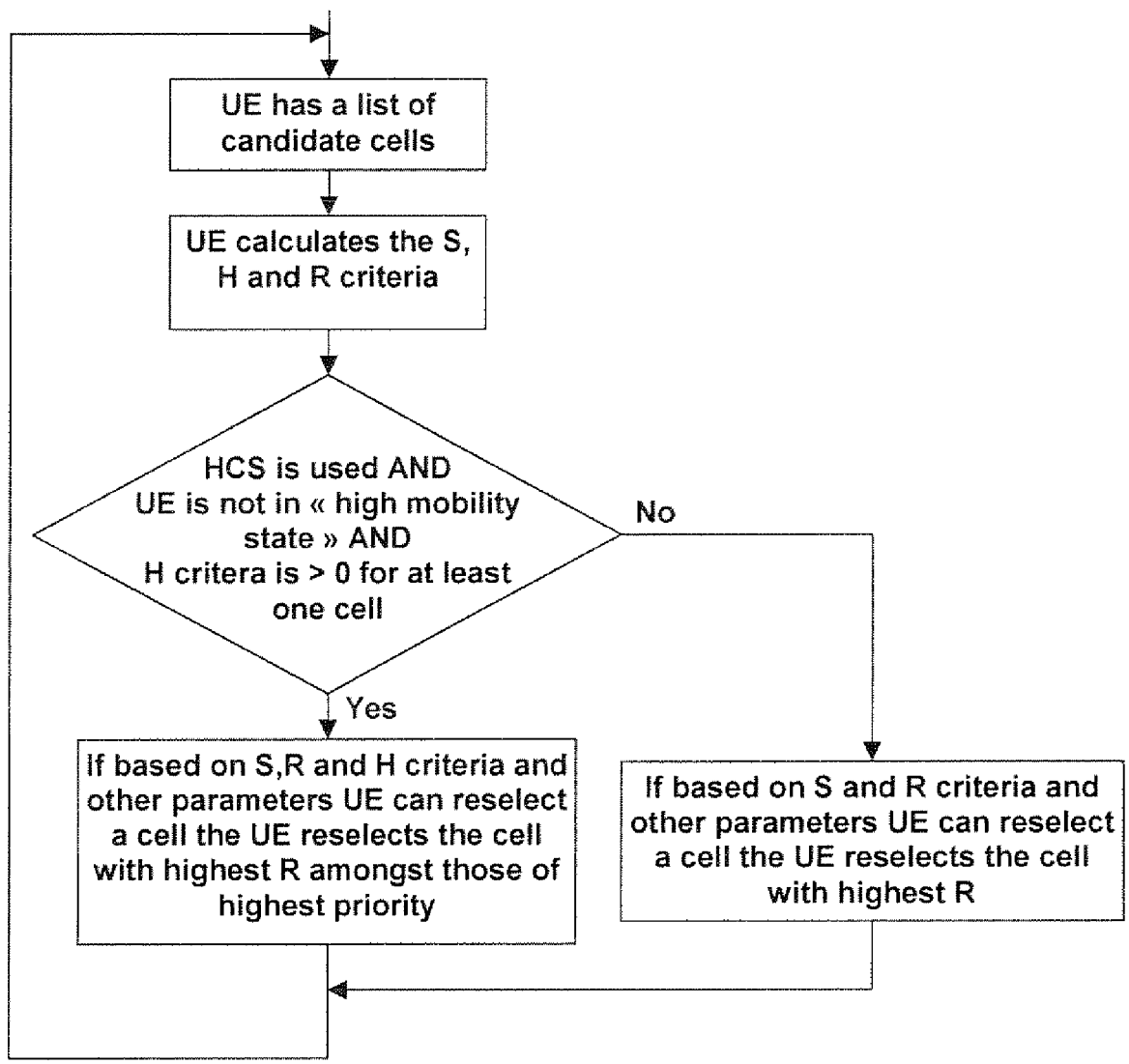
FIG. 6 illustrates a decision process for cell selection.
Figure 7:
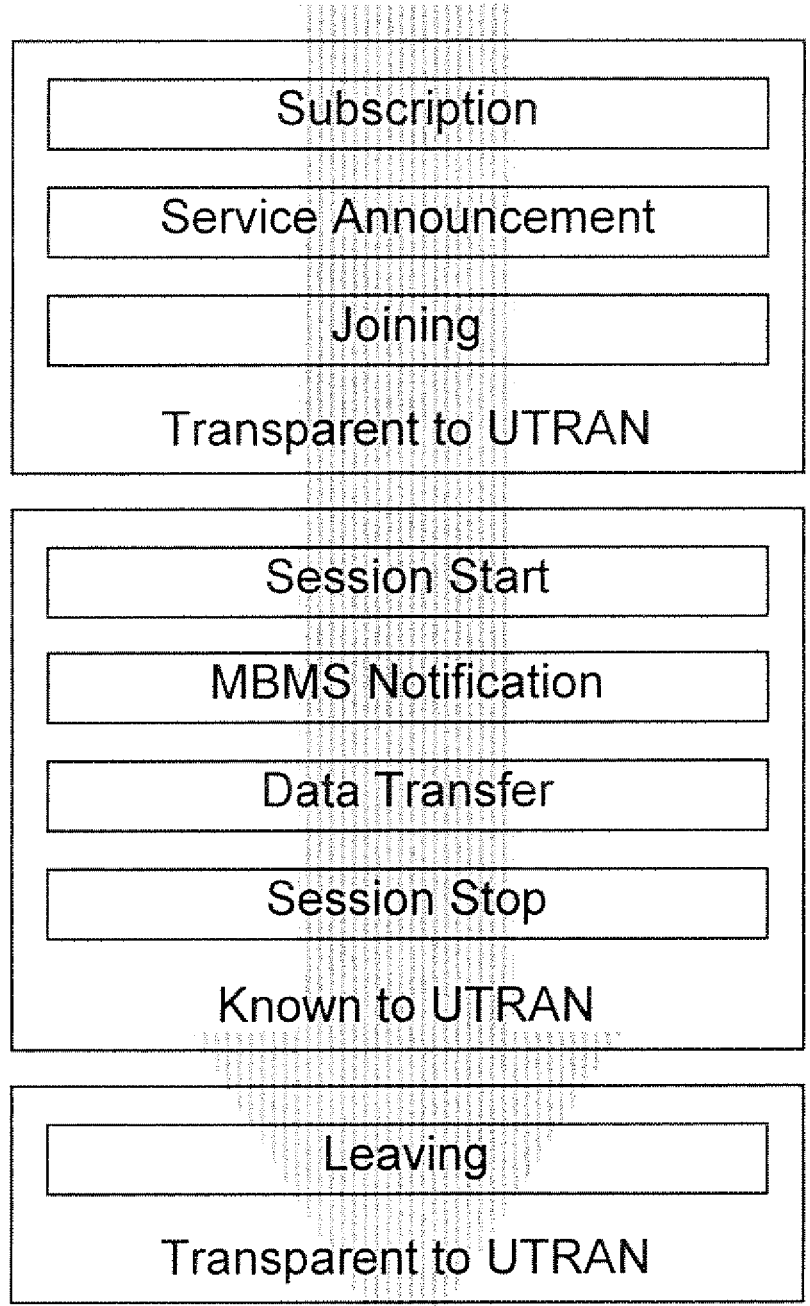
FIG. 7 illustrates a process of providing a particular point-to-multipoint service using a multicast mode.
Figure 8:
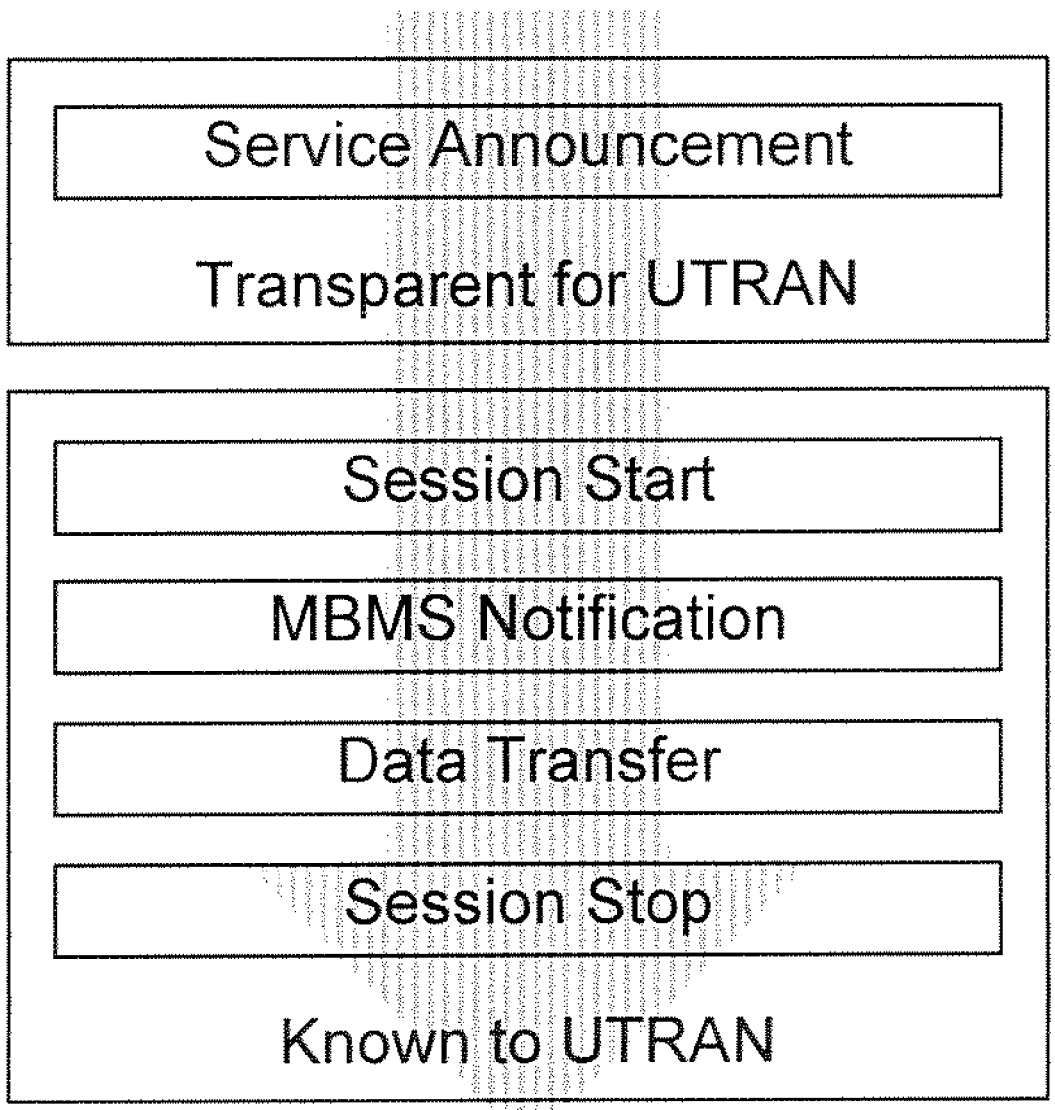
FIG. 8 illustrates a process of providing broadcast services.
Figure 9:
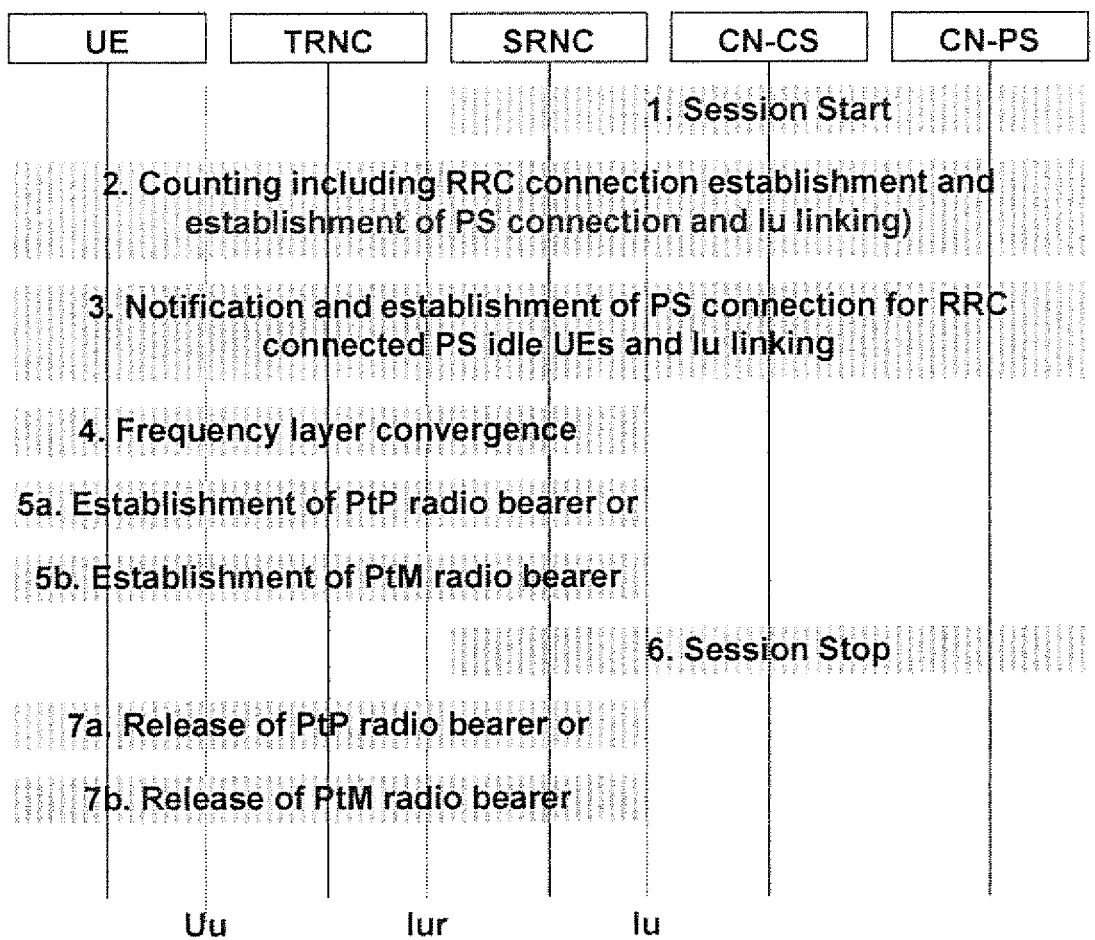
FIG. 9 illustrates a session sequence from a network perspective.
Figure 10:
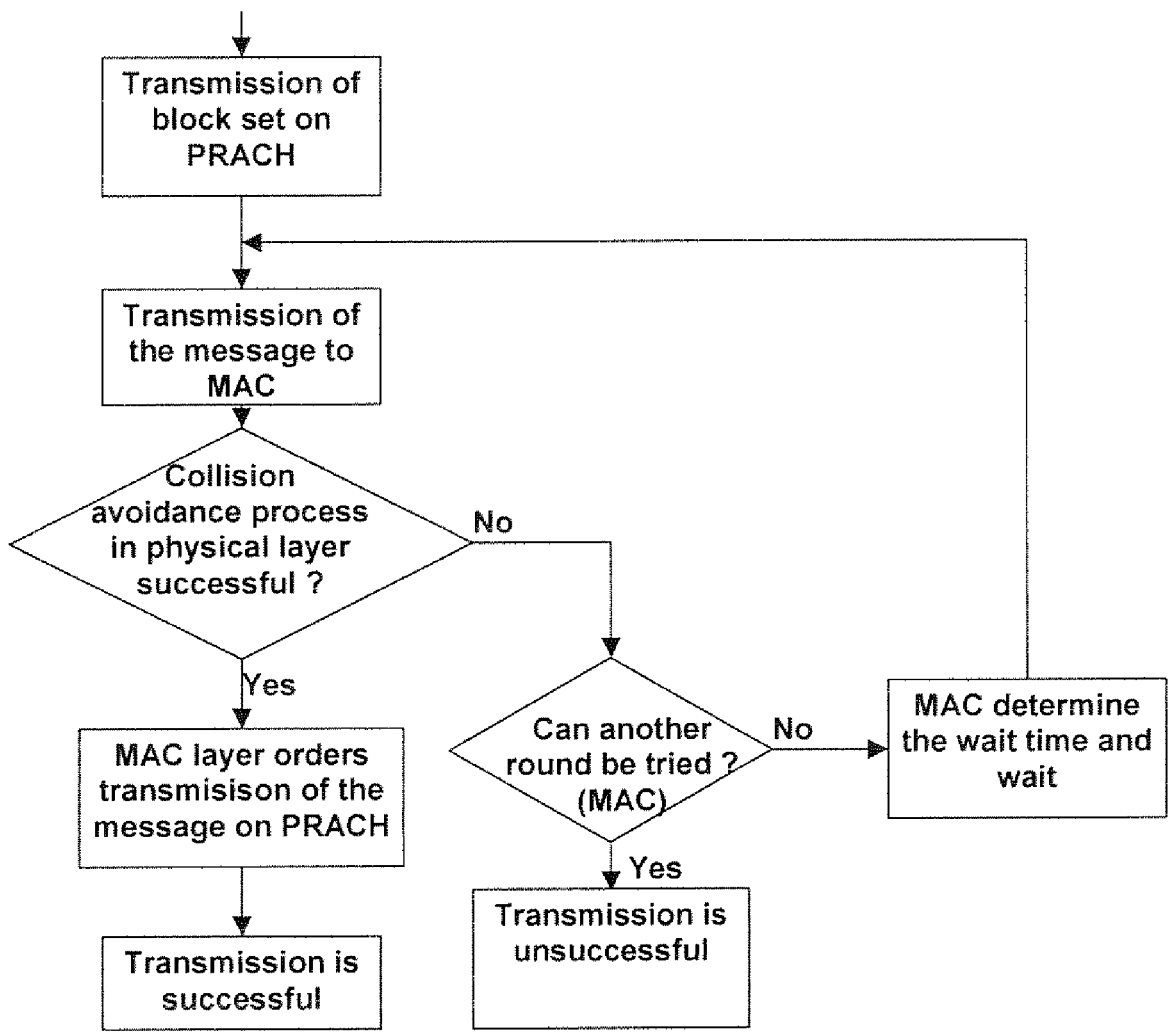
FIG. 10 is flow chart for transmitting a message on a PRACH channel.

The present invention relates to a UE having joined a service for which a "preferred frequency" is defined but should not use a "frequency layer convergence" scheme under certain circumstances. For example, the frequency layer convergence scheme should not be used when the UE tries to establish a new call, or when the UE fails to access the network on the preferred frequency while using a method favoring a preferred frequency of a joined MBMS service.

Several methods exist for determining whether the UE should stop applying a method favoring the selection of a cell on a given "preferred frequency". Preferably, when the frequency layer convergence scheme is interrupted for the preferred frequency, it should be interrupted for any service for which the preferred frequency is the given frequency.

In accordance with a first embodiment of the present invention, the UE stops using the frequency layer convergence scheme when certain conditions occur as a result of using the frequency convergence scheme. Preferably, during a PRACH access procedure, when the UE receives in a MAC layer notification that a collision avoidance process has failed in a physical layer, or when the UE receives a NACK on the AICH channel or receives no response at all from a NodeB, or when a MAC procedure for transmitting data on the preferred frequency fails as a result of the UE using the frequency layer convergence scheme, the UE ceases to use the scheme.

In accordance with a second embodiment of the present invention, the UE stops using the frequency layer convergence scheme when the UE must perform a specific procedure, such as when the UE tries to perform an emergency call. Another specific procedure is when the NAS (Non-Access Stratum) layers indicate to the AS (Access Stratum) layer of the UE to establish a connection with a CN domain for a specific reason, such as Originating Conversational Call, Originating Streaming Call, Originating Interactive Call, Originating Background Call, Originating Subscribed Traffic Call, Terminating Conversational Call, Terminating Streaming Call, Terminating Interactive Call, Terminating Background Call, Emergency Call, Inter-RAT cell re-selection, Inter-RAT cell change order, Registration, Detach, Originating High Priority Signaling, Originating Low Priority Signaling, Call Re-establishment, Terminating High Priority Signaling, Terminating Low Priority Signaling, Terminating-cause unknown, or any subset of these reasons.

In accordance with a third embodiment of the present invention, the UE stops using the frequency layer convergence scheme when the UE is asked to select a cell on a given frequency, either in CELL_FACH state, in CELL_PCH state, in URA_PCH state or in idle mode.

When the UE stops using the frequency layer convergence scheme for one of the above reasons, it becomes necessary to also define a method for restarting the frequency layer convergence scheme again. Preferably, a trigger for restarting the frequency layer convergence scheme may be when the procedure that triggered the stoppage of the frequency layer convergence scheme is finished successfully or unsuccessfully. Alternatively, at a point when use of the frequency layer convergence scheme is stopped, the UE may start a timer such $T_{freq\_conv\_int}$. At the end of a time period of the timer, use of the frequency layer convergence scheme is restarted. Accordingly, this limits interruption of the use of the frequency layer convergence scheme. Preferably, the timer is broadcast on the system information of the cell.

Figure 11:
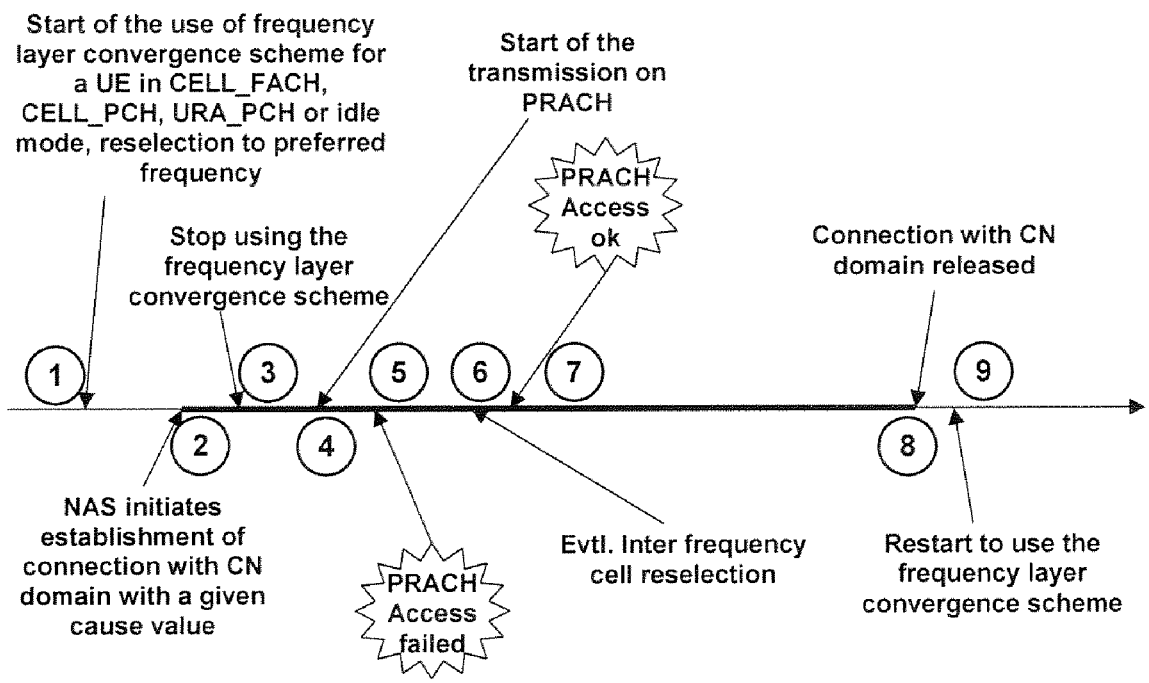
FIG. 11 illustrates the interruption of a frequency layer convergence scheme in accordance with one embodiment of the present invention.

Referring to FIG. 11, a method for executing an emergency call by a UE with respect to a frequency layer convergence scheme is illustrated. Initially, the UE in a CELL_FACH, CELL_PCH, URA_PCH or idle mode begins using a frequency layer convergence scheme (step 1). This allows the UE to reselect a preferred frequency. Subsequently, when NAS indicates to the AS that a connection to a CN domain must be established, a specific cause value is given to the UE (step 2).

Based on the cause value, the UE may stop use of the frequency layer convergence scheme (step 3). Accordingly, when the UE stops using the frequency layer convergence scheme, the UE changes the way it evaluates the neighboring cells. When the UE needs to establish a connection to a core network domain when the UE is in an idle mode, CELL_FACH, CELL_PCH or URA_PCH state, it is implied that the UE must transmit a message, such as Cell Update, RRC Connection Request and/or Initial Direct transfer, on the PRACH channel to the NodeB (step 4).

When the current cell or cells on the current frequency are loaded, the PRACH channel access may fail on the current frequency (step 5). Eventually, the UE will reselect a cell on another frequency as the preferred frequency since the frequency layer convergence scheme is no longer used (step 6). After the cell reselection, access to the PRACH will have a higher chance of succeeding because the best cell is chosen (step 7).

After the call is finished, the connection to the CN domain is released (step 8). The UE will then restart use of the frequency layer convergence scheme if it is still applied (step 9).

Figure 12:
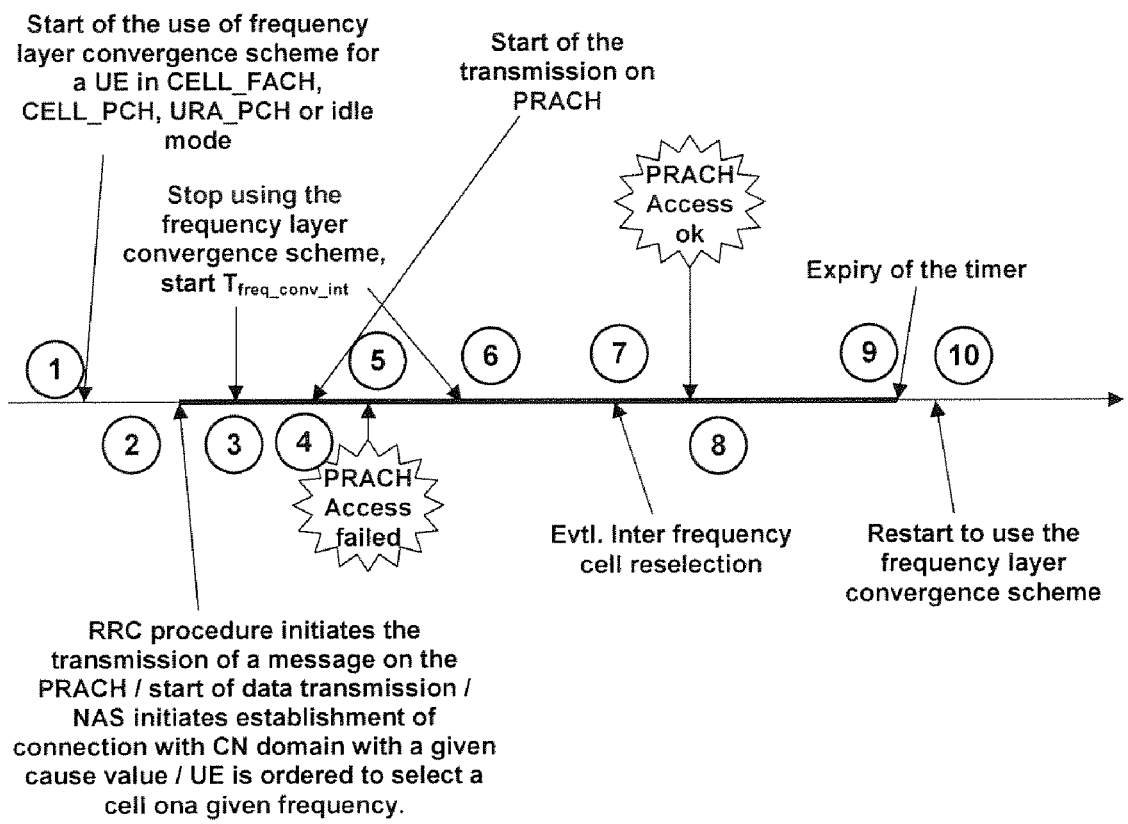
FIG. 12 illustrates the interruption of a frequency layer convergence scheme using a timer in accordance with one embodiment of the present invention.

Referring to FIG. 12, a method for stopping frequency layer convergence by a UE based on a timer is illustrated. Initially, the UE in a CELL_FACH, CELL_PCH, URA_PCH or idle mode begins using a frequency layer convergence scheme (step 1). This allows the UE to reselect a preferred frequency.

Subsequently, any one of a number of events may occur (step 2). For example, the NAS may indicate to the AS that a connection to a CN domain must be established and gives a specific cause value to the UE. Or an RRC procedure is started which requires transmission in the uplink. Also, the transmission of data in the uplink may be started. Or the UE may be ordered to select a cell on a given preferred frequency.

Accordingly, the UE ceases use of the frequency layer convergence scheme. When the UE stops using the frequency layer convergence scheme, the UE will change the way it evaluates the neighboring cells. Also, upon stopping the use of the scheme, the UE starts a timer $T_{freq\_conv\_int}$ (step 3). The duration of the timer may be a fixed value, or the UE may utilize a value read in the system information.

The UE then transmits data on the PRACH channel to the NodeB (step 4). When the current cell or cells on the current frequency are loaded, the PRACH channel access may fail on the current frequency (step 5).

An alternative to starting the timer $T_{freq\_conv\_int}$ in step 3 is to start it once the first PRACH access procedure has failed (step 6). The PRACH access procedure may fail due to a reception of a NACK, no reception of a response message, or when a retry mechanism in the MAC layer has timed out, such that there is no more retransmission. The duration of the timer may be a fixed value, or the UE may utilize a value read in the system information.

Eventually, the UE will reselect a cell on another frequency as the preferred frequency since the method for frequency layer convergence scheme is no longer used (step 7). After the cell reselection, access to the PRACH will have a higher chance of success because the best cell is chosen (step 8).

When the timer $T_{freq\_conv\_int}$ expires and after the call has ended, the connection to the CN domain is released (step 9). The UE will then restart use of the frequency layer convergence scheme if it is still applied (step 10).

Accordingly, the present invention ensures a UE having joined an MBMS service, will have the same or similar chance of success in establishing a new call/emergency call or transmitting data, as the same UE not having joined an MBMS service.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of frequency selection for an MBMS (Multimedia Broadcast/Multicast Service) service, the method performed by a mobile terminal and comprising:
   receiving a message that instructs an interruption of a MBMS frequency selection procedure, wherein the message initiates a reconfiguration procedure; and
   stopping the MBMS frequency selection procedure if the mobile terminal is not in CELL_DCH state,
   wherein the MBMS frequency selection procedure allows the mobile terminal to select a preferred frequency of the MBMS service.

2. The method of claim 1, wherein the received message includes a specific value that is used to stop the MBMS frequency selection procedure.

3. The method of claim 1, wherein the mobile terminal is not in CELL_DCH state means that the mobile terminal is in CELL_FACH state, in CELL_PCH state, in URA_PCH state or in idle mode.

4. The method of claim 1, wherein the MBMS frequency selection procedure uses a frequency layer convergence scheme for selecting a cell, wherein the frequency layer convergence scheme favors the selection of the cell on the preferred frequency of the MBMS service.

5. The method of claim 1, wherein the use of the frequency layer convergence scheme is interrupted upon receiving the message that initiates the reconfiguration procedure.

6. The method of claim 5, wherein a trigger for interrupting the use of the frequency layer convergence scheme is based on a procedure initiated with a network that fails while using the frequency layer convergence scheme.

7. The method of claim 6, wherein the procedure with the network comprises establishing a connection with a core network (CN) domain, wherein the CN domain is at least a packet switched (PS) domain or a circuit switched (CS) domain.

8. The method of claim 6, wherein the procedure with the network comprises at least:
   a PRACH access procedure;
   a radio resource control (RRC) procedure for transmitting information to the network;
   a medium access control (MAC) procedure for transmitting data to the network; or
   a procedure for selecting a cell on a given frequency according to an order received from the network.

9. The method of claim 5, wherein a trigger for interrupting the use of the frequency layer convergence scheme comprises:
   initiating a procedure for selecting a cell on a given frequency according to an order received from the network.

10. A mobile terminal that performs frequency selection for an MBMS (Multimedia Broadcast/Multicast Service) service, the mobile terminal comprising:
    means for receiving a message that instructs an interruption of a MBMS frequency selection procedure, wherein the message initiates a reconfiguration procedure; and
    means for stopping the MBMS frequency selection procedure if the mobile terminal is not in CELL_DCH state,
    wherein the MBMS frequency selection procedure allows the mobile terminal to select a preferred frequency of the MBMS service.

11. The mobile terminal of claim 10, wherein the received message includes a specific value that is used to stop the MBMS frequency selection procedure.

12. The mobile terminal of claim 10, wherein the mobile terminal is not in CELL_DCH state means that the mobile terminal is in CELL_FACH state, in CELL_PCH state, in URA_PCH state or in idle mode.

13. The mobile terminal of claim 10, wherein the MBMS frequency selection procedure uses a frequency layer convergence scheme for selecting a cell, wherein the frequency layer convergence scheme favors the selection of the cell on the preferred frequency of the MBMS service.

14. The mobile terminal of claim 13, wherein the use of the frequency layer convergence scheme is interrupted upon receiving the message that initiates the reconfiguration procedure.

15. A method of transmitting a message in order for a mobile terminal to perform frequency selection for an MBMS (Multimedia Broadcast/Multicast Service) service, the method performed by a network and comprising:
    transmitting the message that instructs an interruption of a MBMS frequency selection procedure, wherein the message initiates a reconfiguration procedure,
    wherein the mobile terminal stops the MBMS frequency selection procedure according to the transmitted message if the mobile terminal is not in CELL_DCH state, and
    wherein the MBMS frequency selection procedure allows the mobile terminal to select a preferred frequency of the MBMS service.

16. The method of claim 15, wherein the transmitted message includes a specific value that is used to stop the MBMS frequency selection procedure.

17. The method of claim 15, wherein the mobile terminal is not in CELL_DCH state means that the mobile terminal is in CELL_FACH state, in CELL_PCH state, in URA_PCH state or in idle mode.

18. The method of claim 15, wherein the MBMS frequency selection procedure uses a frequency layer convergence scheme for selecting a cell, wherein the frequency layer convergence scheme favors the selection of the cell on the preferred frequency of the MBMS service.

19. The method claim 18, wherein the use of the frequency layer convergence scheme is interrupted according to the message that initiates the reconfiguration procedure.

* * * * *